United States Patent
Hinz et al.

(10) Patent No.: US 9,396,372 B2
(45) Date of Patent: Jul. 19, 2016

(54) METHOD FOR MONITORING A SYSTEM COMPRISING A NUMBER OF READERS AND A PLURALITY OF PORTABLE COMMUNICATION UNITS

(71) Applicant: GIESECKE & DEVRIENT GMBH, Munich (DE)

(72) Inventors: Walter Hinz, Garching (DE); Klaus Finkenzeller, Unterfohring (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 118 days.

(21) Appl. No.: 14/381,270

(22) PCT Filed: Feb. 25, 2013

(86) PCT No.: PCT/EP2013/000541
§ 371 (c)(1),
(2) Date: Aug. 27, 2014

(87) PCT Pub. No.: WO2013/127511
PCT Pub. Date: Sep. 6, 2013

(65) Prior Publication Data
US 2015/0102909 A1     Apr. 16, 2015

(30) Foreign Application Priority Data

Feb. 27, 2012   (DE) .......................... 10 2012 003 862

(51) Int. Cl.
*H04Q 5/22*      (2006.01)
*G06K 7/10*      (2006.01)
*H04L 9/32*      (2006.01)
*G07B 15/02*     (2011.01)
*G06Q 20/34*     (2012.01)

(52) U.S. Cl.
CPC .......... *G06K 7/10366* (2013.01); *G06Q 20/352* (2013.01); *G07B 15/02* (2013.01); *H04L 9/3234* (2013.01)

(58) Field of Classification Search
CPC . G06K 7/10366; G06Q 20/352; G07B 15/02; H04L 9/3234
See application file for complete search history.

(56) References Cited

U.S. PATENT DOCUMENTS 5,517,188  A   5/1996  Carroll et al.
6,766,161  B2  7/2004  Geiselman et al.
(Continued)

OTHER PUBLICATIONS

German Search Report from corresponding German Patent Application No. DE 10 2012 003 862.3, Dec. 21, 2012.
(Continued)

*Primary Examiner* — Omeed Alizada
(74) *Attorney, Agent, or Firm* — Workman Nydegger

(57) ABSTRACT

A method for monitoring a system includes reading devices and a plurality of portable communication units, wherein during operation of the system, for a communication unit there are carried out a plurality of data transactions between at least one reading device and the communication unit via a corresponding communication interface. Within the framework of a data transaction a first data set is transferred from a reading device to the communication unit and stored. A second data set stored in the communication unit is transferred to the reading device. Chaining occurs with first and second data sets of the respective data transactions are formed so that in two consecutive data pairs the first data set of the one data pair corresponds to the second data set of the other data pair, and a criterion is checked for being fulfilled.

14 Claims, 3 Drawing Sheets

(56) References Cited

U.S. PATENT DOCUMENTS

| | | | | |
|---|---|---|---|---|
| 8,138,889 B2* | 3/2012 | Fischer | ............... | H04L 9/3226 340/10.1 |
| 8,610,538 B2* | 12/2013 | Loh | ............... | G06F 21/35 235/492 |
| 2002/0072349 A1 | 6/2002 | Geiselman et al. | | |
| 2005/0007236 A1 | 1/2005 | Lane et al. | | |
| 2006/0164207 A1* | 7/2006 | Wilcox | ............... | B60R 25/24 340/5.61 |

OTHER PUBLICATIONS

International Search Report from corresponding PCT Application No. PCT/EP2013/000541, May 24, 2013.

Ilic, A. et al., "Synchronized Secrets Approach for RFID-enabled Anti-Counterfeiting", Internet of Things Conference 2008, Jan. 1, 2008, 4 pages.

Lehtonen, Mikko et al., "How to Detect Cloned Tags in a Reliable Way from Incomplete RFID Traces", 2009 IEEE International Conference on RFID, Apr. 27, 2009, pp. 257-264.

Hasan, Md. Foisal Mahedi et al., "RFID-based Ticketing for Public Transport System: Perspective Megacity Dhaka", 2010 3rd IEEE International Conference on Computer Science and Information Technology, Jul. 9, 2010, pp. 459-462.

Arbit, Alex et al., "Toward Practical Public Key Anti-Counterfeiting for Low-Cost EPC Tags", IEEE International Conference of RFID, 2011, 9 pages.

"Information technology—Radio frequency identification for item management—Part 63: Parameters for air interface communications at 860 MHz to 960 Mhz Type C", Draft International Standard ISO/IEC DIS 18000-63, 2011, 306 pages.

* cited by examiner

METHOD FOR MONITORING A SYSTEM COMPRISING A NUMBER OF READERS AND A PLURALITY OF PORTABLE COMMUNICATION UNITS

BACKGROUND

The invention relates to a method for monitoring a system comprising a number of reading devices and a plurality of portable communication units.

From the prior art there are known systems with which utilized services are captured via a data exchange between a reading device and a portable communication unit carried by the user, so that these services can be billed to the user at a later time. Systems for capturing services are known in particular from the field of public transport. Via corresponding reading devices in means of transport, which communicate with the communication units of users, the travelled paths are captured here.

In the just described systems there are often employed RFID tags as portable communication units, which contactlessly communicate with a corresponding reading device. In many applications there are used UHF-RFID tags which can be queried by a corresponding RFID reading device and send back their identity by modulation of the high-frequency energy scattered back at the antenna of the tag (backscatter). As UHF tags have no power supply of their own, they are normally of a simple construction and only insufficiently protected against forgery.

In the print A. Arbit, J. Oron, A. Wool, Toward Practical Public Key Anti-Counterfeiting for Low-Cost EPC Tags, 2011, IEEE International Conference on RFID, there is described a protocol based on a public key cryptography for the secured identification of RFID tags. This protocol prevents the creation of new tags, but does not protect against the manufacturing of duplicates of already existing tags.

In the print U.S. Pat. No. 6,766,161 B2 there is described a method for recognizing duplicated communication devices based on transaction codes. Here, in a host and a communication device there is held a sequence of consecutive transaction codes, upon each communication between host and communication device there being transmitted a new transaction code of the sequence to the host. The host then checks whether the transmitted transaction code matches the transaction code which is to be expected according to the sequence deposited at the host.

SUMMARY

This object is achieved by the method according to claim 1 and the system according to claim 13. Developments of the invention are defined in the dependent claims.

The method according to the invention serves for monitoring a system comprising a number of reading devices and a plurality of portable communication units. During operation of the system, for a given communication unit, which can represent an arbitrary communication unit of the plurality of communication units, there are carried out a plurality of data transactions between at least one reading device and the given communication unit via a corresponding communication interface. If the system includes several reading devices, also different reading devices can be involved in the data transactions. An individual data transaction, however, is always carried out between a reading device and the given communication unit. Preferably, the communication interface between reading device and communication unit is a contactless interface and the portable communication units represent accordingly configured transponders which communicate with suitable contactless reading devices. In particular, the transponders are the above-mentioned RFID transponders or UHF-RFID transponders.

Within the framework of a data transaction, during operation of the system there is transmitted a first data set from a reading device to the given communication unit and stored there. Further, a second data set, which was stored in the given communication unit upon the most recently carried out data transaction, is transferred to the reading device. A data transaction carried out is understood to be here a data transaction which was completed, i.e. for which the storing of a first data set as well as the transfer of a second data set was carried out.

In the method according to the invention there is carried out a suitable evaluation of the data sets transferred in the system, with a computer unit which can be configured e.g. as a central server. In so doing, a chaining of data pairs comprising the first and second data set of the respective data transactions is formed in such a way that for two consecutive data pairs of the chaining the first data set of the one data pair corresponds to the second data set of the other data pair. This chaining can also be interrupted, where applicable. Upon forming the chaining there is checked a criterion which is fulfilled when the chaining has several parallel chains of data pairs or when two data pairs are found which include different first data sets while the second data set is the same.

Parallel chains are understood to be here chains of data pairs which are independent of each other and/or at least partly temporally overlapping. The chains contain respectively consecutive data pairs according to the above definition, i.e. for two consecutive data pairs the first data set of the one data pair corresponds to the second data set of the other data pair. Nevertheless, a chain can also be interrupted at one or several points. The occurrence of parallel chains allow the conclusion that two identical communication units exist side by side and carry out data transactions which are not connected to each other. Upon the recognition of such chains or of data pairs having different first and the same second data sets, a duplication of the given communication unit is recognized by the computer unit. As a result, corresponding counter measures can be initiated. In a preferred embodiment, the communication unit in the system will be blocked from being further employed.

The method according to the invention has the advantage that duplicates are reliably recognized even in the case of very simply constructed communication units. In particular, no complex cryptographic protocols have to be implemented in the communication units, because a cloning of a communication unit is captured in the system via the chaining of data pairs.

In a particularly preferred embodiment of the method according to the invention a respective first data set includes a time information item which relates to the carrying out of the data transaction using this first data set. Here, several parallel chains are detected in a simple manner in that the data pairs are arranged according to the time sequence of the time information items of their first data sets, and the presence of parallel chains is ascertained when a second data set of a data pair differs from the first data set of a data pair directly preceding in the time sequence. The concept of time information is to be understood broadly here and does not have to include an explicit time specification. E.g., a time information item can be coded by consecutive sequence numbers.

In a further, particularly preferred embodiment of the invention the respective second data sets are transferred without additional information items being added by the given communication unit. Thus, the method can be particularly easily implemented, because the respective communication units must merely send previously received data sets anew without any further processing.

In a further configuration of the method according to the invention, the first data set is transferred within the framework of a data transaction in combination with a write command which specifies a first memory address in a memory of the given communication unit, whereupon the first data set is stored at the first memory address.

Here, simple write commands ("write"), as they are known for example from the standard ISO/IEC 18000-63 (the previous ISO/IEC 18000-6C), can be used.

In a further embodiment of the invention, the above-described storing at the first memory address is merely temporary. That is to say, before the final storing at a second memory address the first data set is stored at the first memory address only temporarily, namely until the first data set was subjected to a check.

In a preferred variant, upon this check the first data set is compared with the first data set stored upon the most recently carried out data transaction and/or a signature is verified which was added to the first data set by the reading device. In the case of a sufficient difference between the first data set and the first data set stored upon the most recently carried out data transaction and/or upon a successful verification of the signature, the first data set is finally stored at the second memory address. Otherwise, the first data set is discarded, so that the data transaction was not successfully completed. This variant avoids a multiple storing of the same or similar data sets. The criterion of sufficient difference can be suitably defined depending on the embodiment. E.g., the criterion of sufficient difference can relate only to certain fields in the data set. That is to say, a difference in the other fields does not represent a sufficient difference leading to the storage of the data set.

In a further configuration of the method according to the invention, within the framework of a data transaction the first data set of the preceding data transaction, which has been stored at the second memory address, is read out as a second data set by means of a read command and transferred to the reading device. For this there can again be employed a simple conventional read command, as it is described for example in the above-mentioned standard ISO/IEC 18000-63.

In a further configuration of the method according to the invention, for several consecutive data transactions carried out in the past the respective first data sets are stored in the given communication unit, preferably in a circular buffer or FIFO memory. This permits a larger number of data transactions to be held in the communication unit and to be read out as needed. Preferably, these first data sets can be read out to a predetermined memory address in the given communication unit by consecutive read commands. In particular, the predetermined memory address can employ a pointer, which points to the data set to be currently read out, the pointer being incremented after the readout of this data set so that upon the next read command the next data set is read out.

In a particularly preferred embodiment, the invention is used for a system which employs several reading devices, the data pairs resulting from the data transactions of the respective reading devices being transferred to the computer unit, which in this case is configured as a central computer unit which is managed for example by the operator of the system. In this computer unit there is then effected the evaluation of the data pairs according to the invention on the basis of the described chaining, so that duplicated communication units are recognized hereby.

The method according to the invention is used in particular in the systems for capturing services as already described above, the provision of the service being captured via the data transactions. In a particularly preferred embodiment, the system is a ticket system for the public transport, the first data sets respectively containing a path information item, which includes in particular a route and a path section on the route and, where applicable, also further information items.

Besides the above-described method, the invention further relates to a system comprising a number of reading devices and a plurality of portable communication units. In analogy to the above method, during operation of the system, for a given communication unit there are carried out a plurality of data transactions between at least one reading device and the given communication unit via a corresponding communication interface, wherein within the framework of a data transaction a first data set is transmitted from a reading device to the given communication unit and is stored there and a second data set, which was stored in the given communication unit upon the most recently carried out data transaction, is transferred to the reading device.

The system contains a computer unit, by means of which a chaining of data pairs comprising the first and second data set of the respective data transactions is formed in such a way that for two consecutive data pairs the first data set of the one data pair corresponds to the second data set of the other data pair. Upon forming the chaining there is here checked a criterion which is fulfilled when the chaining has several parallel chains of data pairs or when two data pairs are found which include different first data sets while the second data set is the same. A duplication of the given communication unit is recognized with the computer unit, when the criterion is fulfilled.

The above-described system according to the invention is preferably configured such that one or several of the preferred variants of the method according to the invention can be carried out with the system.

BRIEF DESCRIPTION OF THE DRAWINGS

Exemplary embodiments of the invention will be described in detail hereinafter with reference to the attached Figures.

There are shown.

DETAILED DESCRIPTION OF VARIOUS EMBODIMENTS

Hereinafter there will be explained an embodiment of the method according to the invention, which is based on a BiBo system of a public transport (BiBo=Be in Be out). Users of this public transport carry a communication unit in the form of a UHF-RFID tag or transponder. Such a tag is based on the standard ISO/IEC 18000-63. This standard specifies contactless transponders and reading devices which work in a UHF band of about 860 MHz to 950 MHz. The transponders are queried with a standard RFID reading device and then send back their identity by modulation of the high-frequency energy scattered by the antenna of the transponder (so-called backscatter method). The RFID tags draw the operating energy from the high-frequency energy radiated by the reading device, if they are passive RFID tags. Moreover, the standard enables also battery-assisted passive tags (BAP=battery assisted passive).

Within the framework of the BiBo system via the contactless communication between the RFID tag and the corresponding reading devices in the means of transport, which a person having the tag employs, the route of this person is captured. Upon a change of the means of transport, the capturing of the route is continued with the corresponding reading device of the new means of transport. In this way, data sets are generated which are transferred to the operator of the BiBo system, who can thus capture the routes covered in a billing period and can charge the owner of the tag therewith. Here it may come to an abuse to the effect that a relevant tag is cloned or duplicated by a third party and is abusively used in the BiBo system. The arising travel costs are then billed to the owner of the original tag. It has to be taken into account here that the hardware of an UHF tag can only be insufficiently protected against a cloning. This is due to the fact that the energy which a UHF tag can draw from the high-frequency field of the reading device is, in general, so low that, in most cases, the tag is composed of only the simplest circuits and thus no complex cryptographic protocols or operations can be realized.

Figure 1:
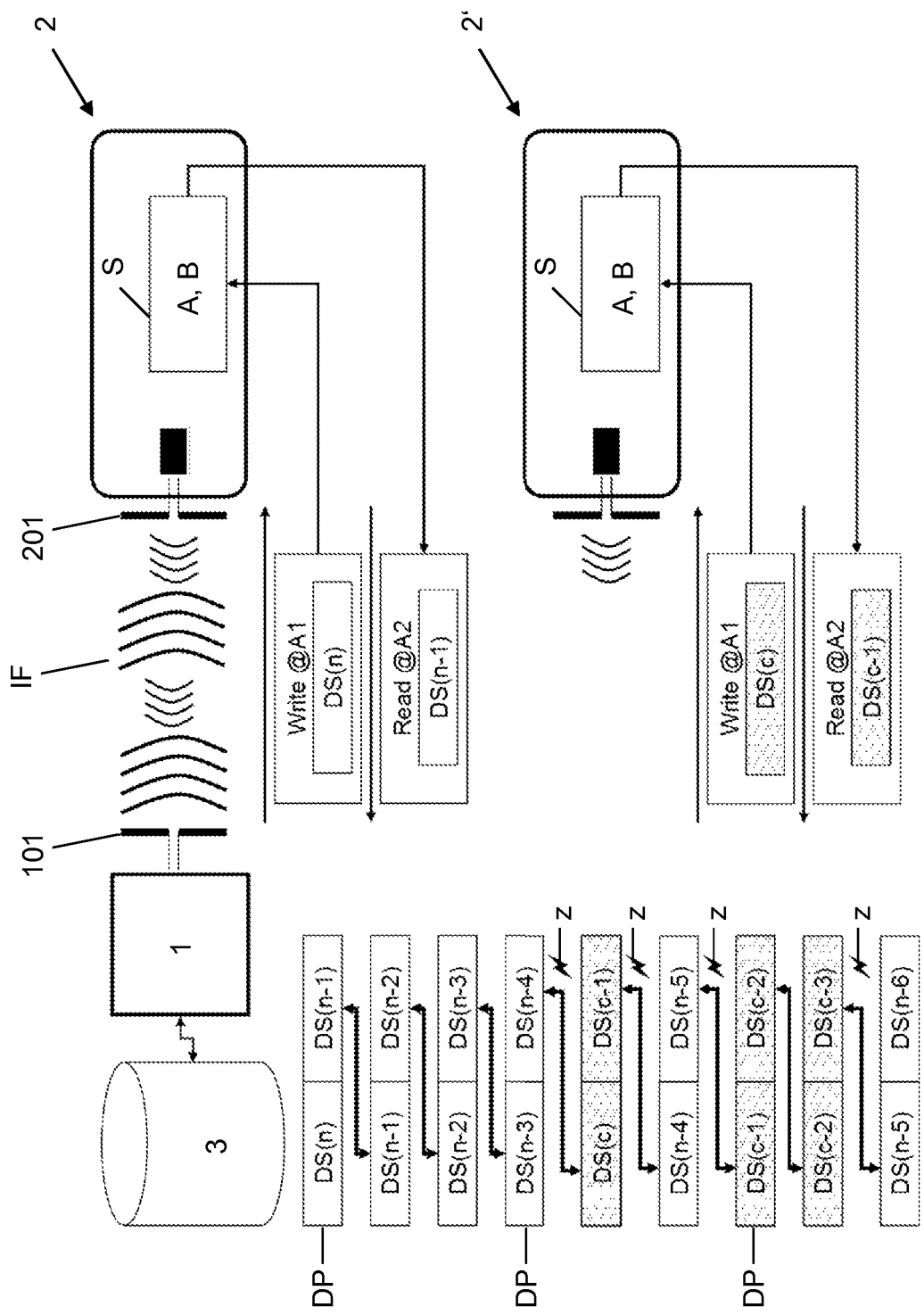
FIG. 1 a schematic representation of a first embodiment of the method according to the invention.

With the embodiments of the method according to the invention described hereinafter there is realized a suitable mechanism for an efficient recognition of cloned tags during operation of the BiBo system. FIG. 1 shows the communication of a reading device 1 with a corresponding RFID tag 2 in such a BiBo system. The communication is effected via the contactless interface IF, via which information items are exchanged between the antenna 101 of the reading device 1 and the antenna 201 of the tag 2. The system includes a plurality of reading devices 1 which are provided in the corresponding means of transport of the public transport. These devices communicate with the corresponding tags within their range. Thus, for each tag there can be captured an information item with regard to the covered route in the form of corresponding data sets which are transferred by the reading devices to a central computer unit or data base 3. There the system operator then performs a billing of the trips covered in a certain billing period to the owners of the respective tags.

Within the framework of the communication between reading device 1 and tag 2, represented in FIG. 1, it is assumed that there was first carried out an identification of the tag to the reading device based on the above-mentioned backscatter method. There can further be used a cryptographic protocol upon the identification, where applicable, such as e.g. the protocol which is described in the above-mentioned print of A. Arbit et al. After the identification the reading device 1 sends via the interface IF by means of a write command Write@A1 a first data set DS(n) to the tag 2. The first data set is stored in a corresponding memory S of the tag 2. This memory includes a first storage region A and a second storage region B, which are not specified in more detail in FIG. 1 but will be explained below with reference to FIG. 3.

Figure 2:
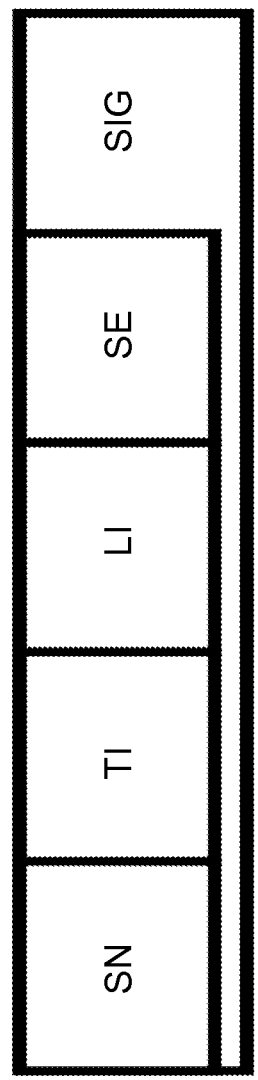
FIG. 2 the structure of a first data set, which is employed in the embodiment of FIG. 1.

FIG. 2 shows the structure of the first data set DS(n) which is transferred from the reading device 1 to the tag 2. The data set includes a sequence number SN assigned by the reading device. It further contains a time T1 in the form of a date or a time of the day, whereby the accuracy of the time does not need to exceed the order of magnitude of a minute. Further, a route information item is deposited in the field LI, which contains the characteristics of a certain trip and trip direction, e.g. within one day. Further, a field SE is provided which specifies the path section between two stops, at which the means of transport was entered. The data set of FIG. 2 is further provided with a signature SIG, which is optional and not represented in FIG. 1 in the transfer of the data set. The signature here can be generated with a key which is specific for the reading device. Likewise, a global signature key valid in the whole system can be employed, where applicable.

After the transfer of the first data set DS(n) to the tag 2 as well as after corresponding check steps, which will be described below with reference to FIG. 3, according to FIG. 1 there is transferred a second data set DS(n−1) by means of the read command Read@A2 to the reading device. The second data set DS(n−1) here is the data set which was transferred from the reading device 1 to the tag 2 upon the most recent data transaction. In the BiBo application a data transaction normally takes place when the means of transport is changed. The first and second data sets DS(n) and DS(n−1) exchanged within the framework of a data transaction are stored as the data pair DP and transferred to the central computer unit 3 of the system operator. In so doing, the accordingly generated data pairs are collected from all the reading devices in the system. In the computer unit 3 the individual data pairs are then chained. In FIG. 1 by way of example there is depicted such a chaining of data pairs. For reasons of clarity, only some of the data pairs are designated with the reference sign DP. The chaining is here effected such that a data pair is linked with a temporally later data pair, when the first data set of the data pair matches the second data set of the temporally later data pair. This chaining is indicated in FIG. 1 with corresponding double arrows. All the data pairs which contain the index n form a continuous chain. And n−6, n−5, . . . , n designate consecutive points in time for the corresponding data transactions of the tag 2.

In the scenario of FIG. 1 it is further to be taken into account that a cloned tag 2' was used parallel to the tag 2. This tag has also carried out corresponding data transactions based on data sets DS(c), DS(c−1) etc. within the framework of the communication with the reading device 1. The corresponding data sets or the data pairs resulting therefrom are depicted in dotted manner in FIG. 1. As one can recognize, these data pairs can also be chained to each other, so that two parallel chains are formed, one chain consisting of the data sets for the tag 2 and the other chain of the data sets for the cloned tag 2'. In the embodiment of FIG. 1 the forming of two parallel chains running independently side by side is ascertained via a temporal sorting of the collected data pairs DP. The list of these data pairs DP of FIG. 1 is sorted such that data sets which were generated later stand higher up in the list. Within the framework of the analysis of the sorting there will be recognized that for certain data pairs the second data set differs from the first data set of the temporally preceding data pair. These cases are marked by serrated symbols z. The recognition of such cases allows the conclusion that temporally parallel to the tag 2 there is employed a cloned tag 2'. As a consequence, the system operator will then block the corresponding tag 2 and thus also its clone from being further used, in order to prevent further abuse.

Besides the recognition of clones on the basis of the temporal sorting, duplicated tags are also detected in the embodiment of FIG. 1 when it turns out that there exist several data pairs which include different first data sets but the same second data set. This situation can only occur, when two identical tags are used in the system. In this case, too, the system operator will arrange for the tag to be blocked accordingly.

The sequence number SN (FIG. 2) assigned by the reading device 1 can be used, where applicable, for the recognition of such cloned tags, which after their generation are always employed together with the original tag. Without a sequence number the original tag and the cloned tag would mostly contain the same data sets, if the time T1 is only roughly resolved. Nevertheless, they can be addressed separately via the reading device, which is ensured by the singularization method described in the standard ISO/IEC 18000-63. By the additional inclusion of the sequence number SN generated by the reading device the data sets are still distinguishable, however, so that clones can be recognized upon the later processing in the computer unit 3.

In the system of FIG. 1 the reading device, which communicates with the tags in the means of transport, carries out an inventarization in each path section of a trip and in this way can also ascertain where a tag has left the means of transport (or where it was present the last time). The tag stores only the first inventarization according to the route or line of the means of transport (field LI of FIG. 2). Subsequent inventarizations with the same route or line, but a different path section of the same trip are not stored. Upon an inventarization request of the reading device in the form of the above-described first data set, the tag responds with the most recently stored second data set, which corresponds to the preceding trip (different line or route and the like).

As already mentioned, the tags' data collected by the reading devices are reported to a central computer 3 which links said data, where applicable, with various trip changes and calculates the fare based thereon and charges it to the customer. With the above-described method, by chaining the data sets there can be recognized inconsistencies and thus cloned tags can be ascertained. A tag for which a clone was recognized leads to the blocking thereof and to an entry of the tag into a blocking list which is distributed to the reading devices in the system. The owner of the blocked tag is notified of the blocking. Thereupon, the tag will no longer be accepted as a ticket in the system.

Hereinafter there will be described with reference to FIG. 3 a memory management of the data sets processed in the tag 2 of FIG. 1. FIG. 3 here shows analogous to FIG. 1 a scenario in which the data set DS(n) having a corresponding signature SIG is deposited in the tag 2 by the reading device 1 via the contactless interface IF by means of the write command Write@A1. From FIG. 3 the structure of the two memory regions A and B of the memory of the tag is apparent. The address A1 specified via the write command lies in the storage region A. There, the data set DS(n) is temporarily stored. Said write command is a conventional WRITE or BLOCK WRITE command of the standard ISO/IEC 18000-63.

Within the framework of the check CH there is first ascertained, whether the relevant data set was to be stored in the first place, because memory space would be unnecessarily wasted, when several data sets are stored for the same transport process. Accordingly, the data set is compared with the most recently stored data set DS(n−1). This data set is located at the memory address A2 according to FIG. 3. When the data sets differ, in a next step the signature SIG of the data set DS(n) is checked. If a key specified for the reading device 1 was used therefor, the tag 2 first checks the certificate of the signature, from which it then infers the public verification key. If a global signature key valid in the whole system is employed, the step of certificate verification is omitted, which has the disadvantage, however, that the system will be broken, if the signature key is compromised. When signature keys are used which are specific for the respective reading devices, the certificate is normally issued with a short runtime, so that already after a sufficiently short time a compromised reader cannot generate valid data sets any longer. The tag can here conclude from the time stamp of its most recently stored entry that the runtime of the signature key has expired.

If, finally, upon the check CH there was recognized the need for storing the data set DS(n) as well as successfully verified the signature thereof, the final storing of the data set at the memory address A2 is effected, thereby the data set DS(n−1) being replaced by the data set DS(n). Prior to this, however, the data set DS(n−1) is transferred via the command Read@A2 to the reading device 1. Further, the data set DS(n) is deposited in the circular buffer or FIFO memory B at the memory address B1, with the consequence that the oldest data set DS(n−x) deposited at the memory address Bx is overwritten and deleted. The number of older preceding data sets in the circular buffer B can be defined system-specifically and depends for example on the tag's average frequency of use, the billing period and quantities connected therewith.

As described above, within the framework of a data transaction the preceding data set DS(n−1) is transferred via the interface IF to the reading device 1 for the formation of data pairs. For this purpose, the read command Read@A2 is employed, with which the memory address A2 is read out. For this again a conventional READ command of the standard ISO/IEC 18000-6C can be employed. The read command can optionally be already employed by the reading device so as to hereby ascertain whether it must send a further data set to the tag for storage. In this way, the system throughput can be optimized, where applicable.

Figure 3:
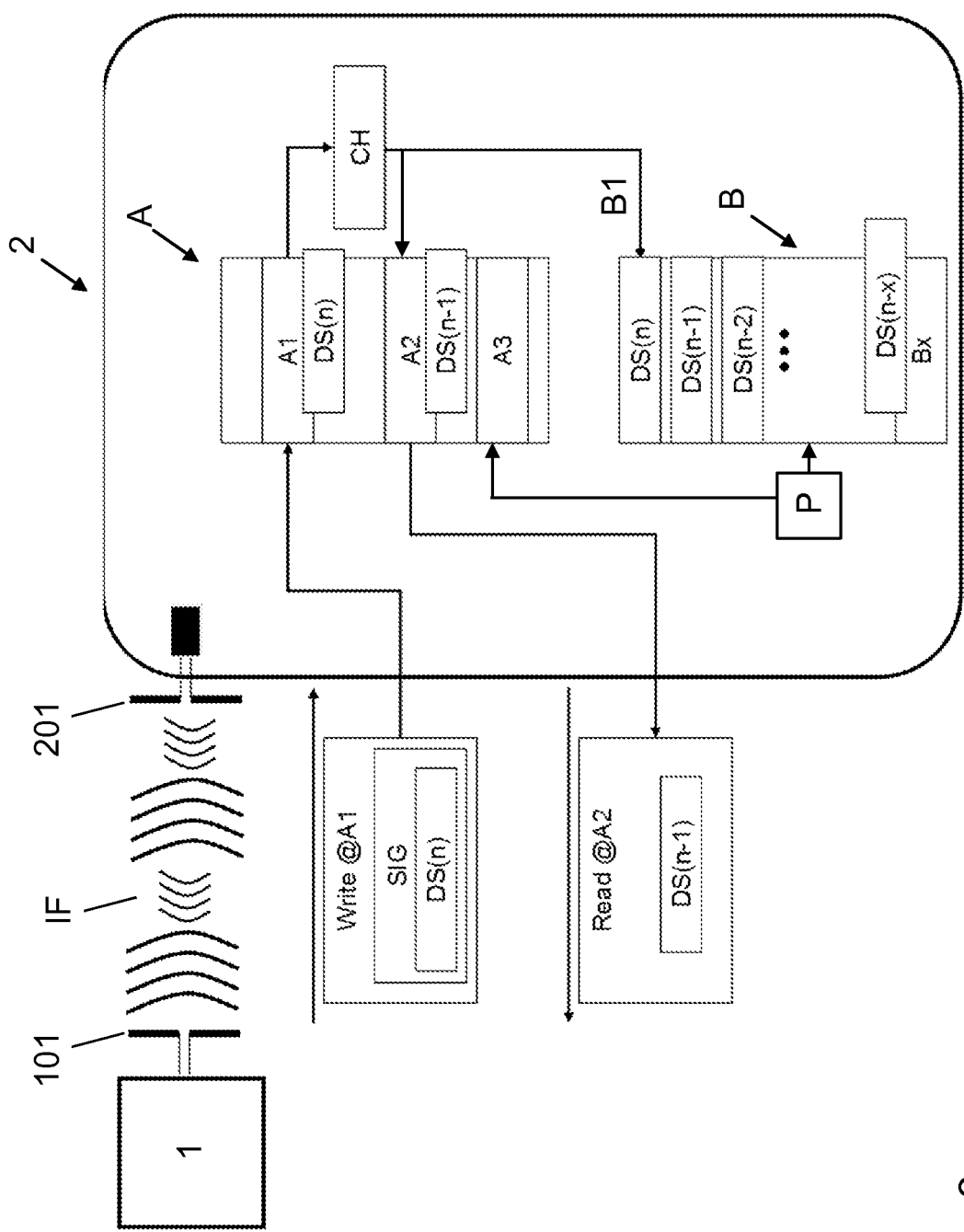
FIG. 3 a schematic representation which depicts the memory management in the RFID transponder which is used in the embodiment of FIG. 1.

In the embodiment of FIG. 3 there is further provided a further memory address A3, which permits the whole circular buffer B to be read out via a READ command to the address A3. With each READ command a further older data set DS(n−2), . . . , DS(n−x) is output via the address A3. This is achieved by the pointer P, which after each readout of a data set points to the preceding data set in the circular buffer B. As the movement profile of the user can be tracked via the access to the address A3, this function is reserved only for certain, explicitly authorized reading devices, which for this purpose must authenticate themselves to the tag. The authentication can again be effected via a public key protocol. With the help of the data read out from the circular buffer there can be ascertained later which trips the user has made in the recorded period and thus where applicable checked a billing.

To avoid the circular buffer B to be overwritten very fast through multiple writing (e.g. by a plurality of different reading devices in a public means of transport) the check CH already mentioned above is provided, according to which it is ascertained whether the current data set differs from the preceding data set. The tag here can be adapted such that a data set is written into the circular buffer or at the address A2 only when a minimum requirement on the difference between the current and the preceding data set is recognized. For example, there can occur the case that all the reading devices in a public train transfer the same path number, train number or stop number in the data set. A tag would then write a data set, after a check, into the circular buffer B or at the address A2 e.g. only when train number or stop number in the data set differ from a previously received data set. Train number and stop number are only exemplary embodiments. In practice, further check criteria, such as e.g. the vehicle identity, the signature, and the like are conceivable.

The hereinabove described embodiments of the method according to the invention have a number of advantages. In particular, a simple and efficient recognition of duplicated portable communication units or tags is achieved without complex cryptographic protocols having to be implemented in the tag. Rather, by the analysis of data pairs of consecutive data sets it is recognized in the system, whether a tag was cloned. The method has in particular advantages when UHF tags are employed, which are operated via the energy of the reading device field and thus have not available a sufficient power supply for cryptographic mechanisms for the protection of the tag.

The invention claimed is:

1. A method for monitoring a system comprising a number of reading devices and a plurality of portable communication units, wherein during operation of the system, for a given communication unit there are carried out a plurality of data transactions between at least one reading device and the given communication unit via a corresponding communication interface, wherein within the framework of a data transaction a first data set is transmitted from a reading device to the given communication unit and stored there and a second data set, which was stored in the given communication unit upon the most recently carried out data transaction, is transferred to the reading device, wherein in a computer unit:
   a chaining of data pairs comprising the first and second data set of the respective data transactions is formed in such a way that for two consecutive data pairs the first data set of the one data pair corresponds to the second data set of the other data pair;
   upon forming the chaining there is checked a criterion which is fulfilled when the chaining has several parallel chains of data pairs or when two data pairs are found which include different first data sets while the second data set is the same;
   a duplication of the given communication unit is recognized when the criterion is fulfilled.

2. The method according to claim 1, wherein the communication units are transponders which communicate via a contactless communication interface with the number of reading devices, wherein the transponders are in particular RFID transponders including UHF-RFID transponders.

3. The method according to claim 1, wherein a respective first data set includes a time information item which relates to the carrying out of the data transaction using this first data set, wherein the data pairs are arranged according to the time sequence of the time information items of their first data sets and several parallel chains are detected when a second data set of a data pair differs from the first data set of a data pair directly preceding in the time sequence.

4. The method according to claim 1, wherein the respective second data sets are transferred without additional information items added by the given communication unit.

5. The method according to claim 1, wherein the first data set is transferred within the framework of a data transaction in combination with a write command which specifies a first memory address in a memory of the given communication unit, whereupon the first data set is stored at the first memory address.

6. The method according to claim 5, wherein before a final storing at a second memory address the first data set is first temporarily stored at the first memory address, until the first data set was subjected to a check.

7. The method according to claim 6, wherein upon the check the first data set is compared with the first data set stored upon the most recently carried out data transaction and/or a signature is verified which was added to the first data set by the reading device, wherein in the case of a sufficient difference between the first data set and the first data set stored upon the most recently carried out data transaction and/or upon a successful verification of the signature, the first data set is stored at the second memory address, and otherwise the first data set is discarded.

8. The method according to claim 6, wherein within the framework of a data transaction the first data set of the preceding data transaction, which has been stored at the second memory address, is read out as a second data set by means of a read command and transferred to the reading device.

9. The method according to claim 1, wherein for several consecutive data transactions carried out in the past the respective first data sets are stored in the given communication unit including a circular buffer or FIFO memory.

10. The method according to claim 9, wherein the respective first data sets of the consecutive data transactions carried out in the past can be read out to a predetermined memory address in the given communication unit by consecutive read commands.

11. The method according to claim 1, wherein the system includes several reading devices and the data pairs resulting from the data transactions of the respective reading devices are transferred to the computer unit which centrally evaluates the data pairs in order to recognize duplicated communication units.

12. The method according to claim 1, wherein the system is a transport ticket system for a public transport and the first data sets respectively contain a path information including a route and a path section on the route.

13. A system comprising a number of reading devices and a plurality of portable communication units, wherein during operation of the system, for a given communication unit there are carried out a plurality of data transactions between at least one reading device and the given communication unit via a corresponding communication interface, wherein within the framework of a data transaction a first data set is transmitted from a reading device to the given communication unit and stored there and a second data set, which was stored in the given communication unit upon the most recently carried out data transaction, is transferred to the reading device, wherein the system includes in a computer unit by means of which:
   a chaining of data pairs comprising the first and second data set of the respective data transactions is formed in such a way that for two consecutive data pairs the first data set of the one data pair corresponds to the second data set of the other data pair;
   upon forming the chaining there is checked a criterion which is fulfilled when the chaining has several parallel chains of data pairs or when two data pairs are found which include different first data sets while the second data set is the same;
   a duplication of the given communication unit is recognized when the criterion is fulfilled.

14. The system according to claim 13, wherein the system is configured for carrying out a method for monitoring a system comprising a number of reading devices and a plurality of portable communication units, wherein during operation of the system, for a given communication unit there are carried out a plurality of data transactions between at least one reading device and the given communication unit via a corresponding communication interface, wherein within the framework of a data transaction a first data set is transmitted from a reading device to the given communication unit and stored there and a second data set, which was stored in the given communication unit upon the most recently carried out data transaction, is transferred to the reading device, wherein in a computer unit:
   a chaining of data pairs comprising the first and second data set of the respective data transactions is formed in such a way that for two consecutive data pairs the first data set of the one data pair corresponds to the second data set of the other data pair;
   upon forming the chaining there is checked a criterion which is fulfilled when the chaining has several parallel chains of data pairs or when two data pairs are found which include different first data sets while the second data set is the same;
   a duplication of the given communication unit is recognized when the criterion is fulfilled.

* * * * *